Dec. 1, 1970 B. B. CASWELL 3,543,599
THROTTLE CONTROL LINKAGE
Filed March 20, 1969
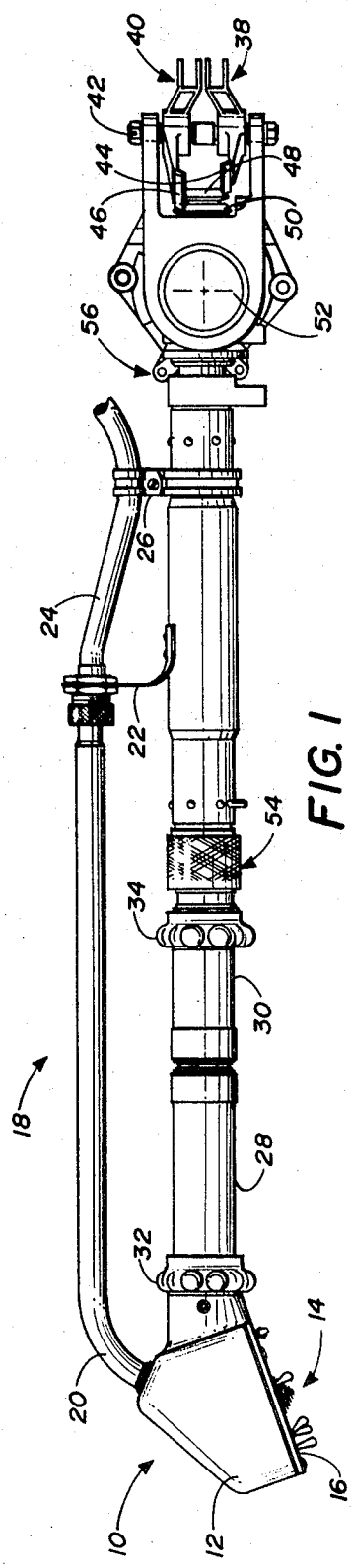
FIG. 1
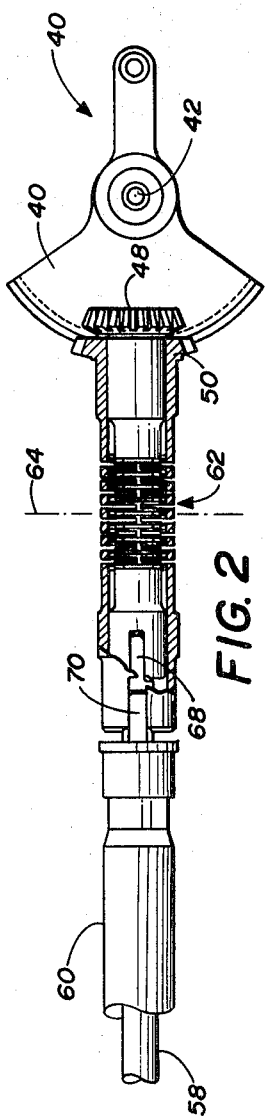
FIG. 2
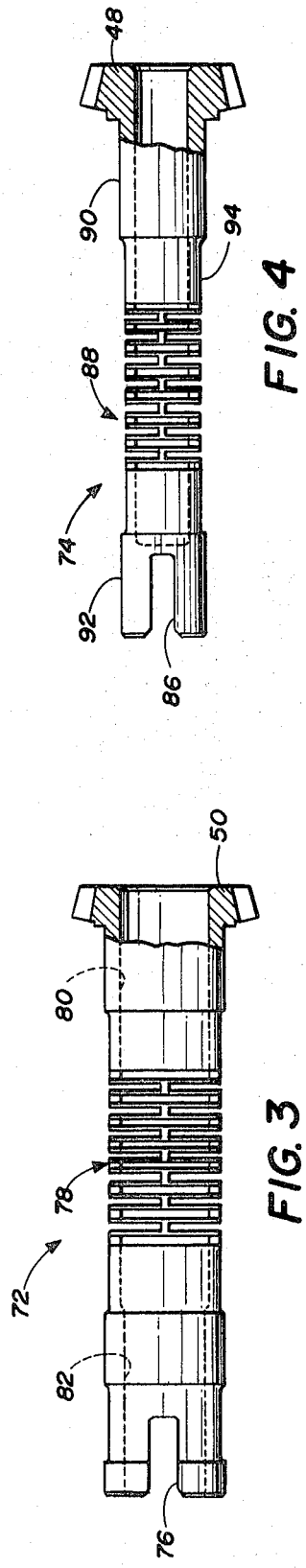
FIG. 4
FIG. 3

United States Patent Office 3,543,599
Patented Dec. 1, 1970

3,543,599
THROTTLE CONTROL LINKAGE
Berwyn Blaine Caswell, Smithfield, Tex., assignor to Textron Inc., a corporation of Delaware
Filed Mar. 20, 1969, Ser. No. 808,896
Int. Cl. G05g 13/00
U.S. Cl. 74—469     24 Claims

ABSTRACT OF THE DISCLOSURE

A linkage provides independent control of the engines of a two-engine helicopter through a control stick mounted for pivotal movement to adjust the collective pitch of the blades of the helicopter. The linkage includes a pair of tubular coaxial shafts terminating in independent control grips and a pair of independent throttle gears. The shafts are connected to the gears by a flexible coupling positioned at the pivotal axis of the stick and comprised of telescoped tubes each characterized by a series of pairs of transverse slots alternately entering the walls of the tubes from mutually perpendicular directions.

---

This invention relates to control sticks for aircraft and more particularly to a control stick for use with two-engine helicopters.

It has long been the practice to control the vertical thrust of helicopters by means of pivotally supported control sticks connected to the collective pitch control of the rotor blades of the helicopter. Frequently, the throttle of the aircraft is operated by a throttle control grip rotatably supported on the control stick so that not only the vertical thrust but also the speed of the aircraft is controlled from the control stick. Heretofore, it has not been possible readily to provide throttle control for both engines of a dual engine aircraft through a pivotally supported control stick because the requirement that the stick be mounted for pivotal movement has prevented the transmission of independent throttle control movements from dual control grips through the stick.

In its most basic form this invention comprises a flexible coupling for transmitting rotational movements from independent sources along a common axis while permitting angular displacement of one portion of the axis with respect to another portion. Preferably the flexible coupling is employed to transmit throttle control movements from independent throttle control grips mounted on a pivotally supported control stick through the pivotal axis of the stick. This permits independent control of the throttles of both engines of a two-engine helicopter through the control stick of the helicopter regardless of the pivotal position of the control stick.

A more complete understanding of the invention may be had by referring to the following detailed description when taken in conjunction with the drawings, wherein:

FIG. 1 is a side view of a two-engine helicopter control stick employing the invention;

FIG. 2 is a sectional view taken along the longitudinal center line of the control stick shown in FIG. 1 in which certain parts have been broken away more clearly to illustrate certain features of the invention;

FIG. 3 is an enlarged side view of the outer member of the flexible coupling employed in the device shown in FIG. 1; and FIG. 4 is an enlarged side view of the inner member of the flexible coupling employed in the device shown in FIG. 1.

Referring now to the drawings, like reference numerals designate like parts throughout several views. Referring particularly to FIG. 1, a control stick 10 adapted for use with two-engine helicopters is shown. A housing 12 is positioned at the top of the control stick 10 and a plurality of switches and other controls 14 extend through the front face 16 of the housing 12. The switches and other controls 14 extend to components positioned within the housing 12 which are in turn connected to the operating instrumentalities of a helicopter (not shown) through an electrical cable 18. The cable 18 is comprised of a solid conduit 20 extending from the housing 12 to a bracket 22 and a flexible portion 24 extending from the bracket 22 through a bracket 26 to the operating instrumentalities of the helicopter.

The control stick 10 further includes a pair of throttle control grips 28 and 30. The throttle control grips 28 and 30 are positioned just below the housing 12 and are supported for rotation about the axis of the control stick 10. Rotation of the grips 28 and 30 is opposed by friction which is controlled by a pair of grip friction adjusting nuts 32 and 34. The nuts 32 and 34 are positioned on the control stick 10 just above and just below the throttle control grips 28 and 30, respectively.

The throttle control grips 28 and 30 control the throttles of the engines of a two-engine helicopter through a pair of throttle control levers 38 and 40, respectively. The levers 38 and 40 are both supported for pivotal movement about the axis of a shaft 42 that is rigidly mounted below the bottom of the control stick 10. The throttle control levers 38 and 40 include gear segments 44 and 46, respectively, which are mounted in mesh with a pair of bevel gears 48 and 50, respectively. Rotation of the gears 48 and 50 is controlled by the control grips 28 and 30, respectively, so that, upon rotation of either of the control grips 28 or 30 the corresponding control lever 38 or 40 is pivoted about the axis of the shaft 42.

The entire control stick 10 is supported for pivotal movement to control the collective pitch of the rotor blades of the helicopter and to thereby control the vertical thrust of the helicopter. The axis of pivotal movement of the control stick 10 is represented in FIG. 1 by a pair of crossed lines 52 adjacent the bottom of the control stick 10. Thus, the motion of the control grips 28 and 30 is transmitted to the control levers 38 and 40 through the axis of pivotal movement of the control stick 10. Pivotal movement of the control stick 10 about the axis represented by the intersection of the crossed line 52 is opposed by friction which is controlled by a knurled nut 54 that operates through a friction adjusting mechanism 56.

Referring now to FIG. 2, the details of the mechanism which transmits the motion of the control grips 28 and 30 to the levers 38 and 40 is shown. The throttle control grip 28 is connected to an inner tubular shaft 58 which extends along the axis of the control stick 10. The throttle control grip 30 is connected to an outer tubular shaft 60 which is telescoped around the inner tubular shaft 58. The shafts 58 and 60 are connected to the bevel gears 48 and 50, respectively, by a flexible coupling 62. The flexible coupling 62 extends across the axis of pivotal movement of the control stick 10 which is represented in FIG. 2 by a line 64. The inner tubular shaft 58 is connected to the flexible coupling 62 by a blade 68 while the outer tubular shaft 60 is connected to the flexible coupling 62 by a pair of ears 70 positioned on opposite sides of the shaft 60.

Referring now to FIGS. 3 and 4, the details of the flexible coupling 62 which interconnects the throttle control grips 28 and 30 and the throttle control levers 38 and 40 is shown. The flexible coupling 62 is comprised of an outer member 72 which is shown in FIG. 3 and an inner member 74 which is shown in FIG. 4. The outer member 72 serves to interconnect the control grip 30 and the outer tubular shaft 60 to the bevel gear 50 and, accordingly, to the throttle control lever 40. The inner control member 74 serves to connect the throttle control grip 28 and the inner tubular shaft 58 to the bevel gear 48 and, accordingly, to the throttle control lever 38. Of course, the inner control member 74 is normally telescoped into the outer member 72 in a manner shown in FIG. 2.

Referring now to FIG. 3, the bevel gear 50 is secured to one end of the outer member 72. The other end of the outer member 72 is provided with a slot 76 adapted to receive the ears 70 of the outer tubular shaft 60. A flexible central section 78 is formed in the outer member 72 between the bevel gear 50 and slot 76. The central section 78 is formed by forming a series of transverse slots into the outer member 72. The slots are formed in sets each comprised of a pair of slots which enter the outer member 72 from radially opposite sides thereof. The slots of alternative sets enter the outer member 72 from mutually perpendicular directions. Thus, the central section 78 of the outer member 72 can accommodate bending of the outer member 72 in any direction with respect to the axis thereof. The outer member 72 has a uniform inner diameter 80 extending from the bevel gear 50 through the central section 68 and has a reduced inner diameter 82 extending from the central section 78 to the end of the outer member 72 opposite the bevel gear 50. The outer member 72 may be formed from any desired material but is preferably formed from 17–4 pH stainless steel.

Referring now to FIG. 4, the details of the inner member 72 are shown. The bevel gear 48 is formed at one end of the inner member 74 and a slot 86 adapted to receive the blade 68 of the inner tubular shaft 58 is formed at the outer end thereof. A flexible central section 88 is formed in the inner member 74 between the ends thereof. Like the flexible central section 78 of the outer member 72, the flexible central section 88 of the inner member 74 is formed from sets of transverse slots formed into the inner member 74. Each set is comprised of two slots which enter the inner member 74 from radially opposite sides thereof. Alternate sets of slots enter the inner member 74 from mutually perpendicular directions. Therefore, the inner member 74 can accommodate bending any direction with respect to the axis thereof. The inner member 74 has an outer diameter 90 adapted to mate with the inner diameter 80 of the outer member 72 and has a reduced outer diameter 92 adapted to mate with the reduced inner diameter 82 of the outer member 72. The outer diameter 94 of the central section 88 of the inner member 74 is smaller than the inner diameter of the central section 78 of the outer member 72. This permits simultaneous pivotal movement of the helicopter control stick 10 and transmission of the motion of the control grips 28 and 30 through the flexible coupling 62 without danger of interengagement between the inner member 74 and the outer member 72. Like the outer member 72, the inner member 74 is preferably formed from 17–4 pH stainless steel.

The function of the control stick 10 is to permit independent control of the dual motors of a two-engine helicopter through the control stick thereof while permitting pivotal movement of the control stick to adjust the collective pitch of the blades of the helicopter. This is accomplished in the mechanism shown in the drawing by the flexible coupling 62 positioned at the pivotal axis of the control stick 10. This function has been accomplished in the past in single engine aircraft by positioning a universal joint at the pivotal axis of the control stick. Heretofore, however, it has been difficult to provide independent control of dual engines through a pivotally supported control stick due to the lack of flexible coupling capable of transmitting rotational motion from two independent sources along a common axis while permitting angular adjustment of a portion of that axis with respect to another portion.

Although only one embodiment of the invention is shown in the drawings and described in the foregoing specification, it will be understood that the invention is not limited to the embodiment disclosed but is capable of rearrangement, modification and substitution of parts and elements without departing from the spirit of the invention.

What is claimed is:

1. A coupling for transmitting rotational motion from two sources along a common axis and for permitting angular displacement between the driving and driven ends of the coupling, which comprises:
    (a) a pair of independently rotable tubular coupling members, one positioned within the other and each comprised of rigid end sections and a flexible central section, the central section of the inner member being positioned within the central section of the outer member; and
    (b) means at the end sections of the members for maintaining the central sections of the members in radially spaced relation with respect to each other.

2. The coupling according to claim 1 wherein the coupling members are each formed from a cylindrical unitary body of material and wherein the central sections of each of the members has a plurality of radially extending slots formed in it.

3. The coupling according to claim 2 wherein the slots are arranged in sets, each set comprised of a pair of radially offset slots which extend into the coupling members from opposite directions.

4. The coupling according to claim 3 wherein the slots of alternative sets enter the coupling members from angularly offset directions.

5. The coupling according to claim 1 further including driven and driving connectors secured to the rigid end sections of the coupling members.

6. A flexible coupling for transmitting rotational motion from two sources along a common axis, which comprises:
    (a) a first cylindrical member having a plurality of pairs of slots extending radially into it;
    (b) a second cylindrical member positioned within the first cylindrical member and having a plurality of pairs of slots extending radially into it;
    (c) means for maintaining the cylindrical members in radially spaced relation one to the other; and
    (d) means for rotating the cylindrical members independently of each other.

7. The flexible coupling according to claim 6 wherein each of the cylindrical members is comprised of three sections along its length and wherein the slots extending into the cylindrical members extend into the center sections thereof.

8. The flexible coupling according to claim 7 wherein the outside diameter of the center section of the second cylindrical member is smaller than the inside diameter of the center section of the first cylindrical member and wherein the spaced relation maintaining means comprises cooperating surfaces on the first and third sections of the cylindrical members.

9. The flexible coupling according to claim 6 wherein alternate ones of the slots extending into the cylindrical members extend into the cylindrical members from different directions.

10. A throttle control linkage for independent control of dual engines through the control stick of a two-engine helicopter, which comprises:
    (a) a pair of telescoped tubes extending along the axis of the control stick;
    (b) a pair of independent output means each responsive to rotation of one of the tubes for controlling one of the engines of the helicopter; and
    (c) a pair of telescoped tubular linkages extending from the tubes to the control means for permitting rotation of the stick about an axis extending substantially perpendicular to the axis of the stick and for independently transferring rotation of the tubes to the output means.

11. The throttle control linkage according to claim 10 wherein the telescoped tubular linkages are positioned at the intersection of the axis of the tubes and the axis extending substantially perpendicular thereto.

12. The throttle control linkage according to claim 10 wherein the independent output means comprises a pair of gears one driven by one of the tubular linkages and the other driven by the other of the tubular linkages.

13. The throttle control linkage according to claim 10 wherein the tubular linkages and the tubes are interconnected by blade and slot connections.

14. The throttle control linkages according to claim 10 wherein the pair of telescoped tubular linkages is comprised of a pair of independently rotatable cylinders one positioned within the other and each having a plurality of slots extending into it from its outer surface toward its axis.

15. The throttle control linkage according to claim 14 wherein certain of the slots formed in each of the cylinders enter the cylinder from a different direction than do others of the slots formed therein.

16. The throttle control linkage according to claim 15 further including slidably interengaged surfaces on the cylinders for maintaining the slotted portions thereof in spaced relation with respect to each other.

17. A coupling for independent transmission of rotational forces about a common axis while permitting simultaneous bending about an axis perpendicular to said common axis which comprises:
(a) an outer tube including an output coupling at one end, an input coupling at the other end and a central section characterized by a series of transverse slots alternatively entering the walls of said outer tube from two mutually perpendicular directions each perpendicular to the axis of said tube, said tube having a uniform inner diameter from said one end to a point beyond said slotted central section and thence a smaller inner diameter to said input coupling; and
(b) an inner tube positioned within said outer tube and including an output coupling at one end positioned adjacent the output coupling of said outer tube, an input coupling at the other end positioned adjacent the input coupling of the outer tube and a central section positioned within the central section of the outer tube and characterized by a series of transverse slots alternately entering the walls of said inner tube from two mutually perpendicular directions each perpendicular to the axis of said tube, said tube having an outer diameter equal to said uniform inner diameter of said outer tube from said one end to said central section, a smaller outer diameter through said central section and thence an outer diameter equal to said smaller inner diameter of said outer tube to said input coupling.

18. The coupling according to claim 17 wherein the slots are arranged in sets, each set including a pair of radially offset slots which enter the walls of the tubes from opposite directions.

19. The coupling according to claim 17 wherein the output couplings of the tubes comprises a pair of gears positioned adjacent each other axially of the tubes.

20. A throttle control linkage for independent control of dual engines through the control stick of a two-engine helicopter, which comprises:
(a) a control stick including coaxial tubes terminating in independent control grips rotatable about the axis of said stick;
(b) means for pivotally mounting said stick for rotation about an axis normal to the axis of said stick for collective pitch control;
(c) a pair of independent gears pivotally mounted on a third axis;
(d) a pair of gears mounted in mesh with the pair of independent gears; and
(e) coaxial tubular linkages extending from the tubes of said stick along the axis of the stick through the axis normal to the axis of said stick to said pair of gears, said coaxial tubular linkages being flexible in the region of the axis normal to the axis of said stick for accommodating bending thereof as said stick is pivoted for collective pitch control while capable of transmitting rotational motion independently from each of said grips to said independent gears.

21. The control linkage according to claim 20 wherein the gears mounted in mesh with the pair of independent gears are formed on the ends of the tubular linkages and wherein the tubes are connected to the tubular linkages by means of blades formed on the ends of the tubes and blade receiving slots formed in the linkages.

22. The control linkage according to claim 20 wherein each tubular linkage includes a pair of end sections connected to one of the tubes and one of the gears mounted in mesh with the independent gears, respectively, and a central section characterized by a series of slots formed in the linkage from the periphery toward the axis thereof.

23. The control linkage according to claim 22 wherein adjacent slots in each of the linkages extend for angularly offset positions about the periphery thereof.

24. The control linkage according to claim 23 wherein the slots in each linkage are formed in radially offset pairs that extend from opposite directions and wherein adjacent slots extend from positions offset of ninety degrees.

References Cited
UNITED STATES PATENTS

| | | | |
|---|---|---|---|
| 2,313,768 | 3/1943 | Putt | 74—471 |
| 2,594,593 | 4/1952 | Slechta | 74—471 |
| 3,150,506 | 9/1964 | Alcaro | 64—15 |

MILTON KAUFMAN, Primary Examiner

U.S. Cl. X.R.

64—15; 74—471, 479